United States Patent [19]

Obara

[11] Patent Number: 4,654,497
[45] Date of Patent: Mar. 31, 1987

[54] CONTACT SENSING APPARATUS IN ELECTRIC DISCHARGE MACHINE

[75] Inventor: Haruki Obara, Sagamihara, Japan
[73] Assignee: Fanuc Ltd, Minamitsuru, Japan
[21] Appl. No.: 709,026
[22] PCT Filed: Jul. 11, 1984
[86] PCT No.: PCT/JP84/00360
  § 371 Date: Feb. 20, 1985
  § 102(e) Date: Feb. 20, 1985
[87] PCT Pub. No.: WO85/00311
  PCT Pub. Date: Jan. 31, 1985

[30] Foreign Application Priority Data

Jul. 13, 1983 [JP] Japan ............... 58-126232

[51] Int. Cl.[4] ............ B23H 1/02; B23H 7/18
[52] U.S. Cl. ............... 219/69 C; 219/69 G
[58] Field of Search ........ 219/69 W, 69 C, 69 P, 219/69 G

[56] References Cited

U.S. PATENT DOCUMENTS

| | | | |
|---|---|---|---|
| 2,969,482 | 1/1961 | Brama et al. | 219/69 P |
| 2,979,639 | 4/1961 | Williams et al. | 219/69 P |
| 3,020,448 | 2/1962 | Fefer | 219/69 P |
| 3,289,040 | 11/1966 | Pfau et al. | 219/69 C |
| 3,292,040 | 12/1966 | Ullmann et al. | 219/69 P |
| 3,390,245 | 6/1968 | Webb | 219/69 C |
| 3,531,615 | 9/1970 | Zammit | 219/69 C |
| 3,825,713 | 7/1974 | Bell, Jr. | 219/69 G |
| 3,988,560 | 10/1976 | Losey et al. | 219/69 P |
| 4,049,942 | 9/1977 | Balleys et al. | 219/69 M |
| 4,163,887 | 8/1979 | Bühler | 219/69 P |
| 4,211,908 | 7/1980 | Niwa | 219/69 P |
| 4,238,660 | 12/1980 | Bell, Jr. et al. | 219/69 G |
| 4,320,278 | 3/1982 | Bell, Jr. et al. | 219/69 C |
| 4,324,970 | 4/1982 | Nanasawa et al. | 219/69 G |
| 4,339,650 | 7/1982 | Tanaka et al. | 219/69 W |
| 4,347,425 | 8/1982 | Obara | 219/69 P |
| 4,376,880 | 3/1983 | Inoue | 219/69 P |

FOREIGN PATENT DOCUMENTS

| | | | |
|---|---|---|---|
| 150169 | 8/1981 | German Democratic Rep. | 219/69 C |
| 55-5230 | 1/1980 | Japan | 219/69 P |
| 201134 | 12/1982 | Japan. | |
| 574297 | 9/1977 | U.S.S.R. | 219/69 C |
| 764916 | 10/1980 | U.S.S.R. | 219/69 C |

Primary Examiner—A. D. Pellinen
Assistant Examiner—Geoffrey S. Evans
Attorney, Agent, or Firm—Staas & Halsey

[57] ABSTRACT

In a contact sensing apparatus in an electric discharge machine, pulsed positive and negative voltages are repeatedly applied between a tool electrode (P) and a workpiece (W) through a pulse transformer (PT). A voltage between the tool electrode (P) and the workpiece (W) is supplied to a comparator (2) through an absolute value circuit (1) and is compared with a reference voltage. A contact between the tool electrode (P) and the workpiece (W) is detected in accordance with an output from the comparator (2).

5 Claims, 3 Drawing Figures

CONTACT SENSING APPARATUS IN ELECTRIC DISCHARGE MACHINE

BACKGROUND OF THE INVENTION

1. Field of the Invention

The present invention relates to a positioning apparatus for aligning a workpiece with a tool electrode in an electric discharge machine and, more particularly, to a contact sensing apparatus in an electric discharge machine, comprising a tool electrode and a workpiece which are moved relative to each other to bring a tool electrode surface into contact with a workpiece reference surface, thereby discriminating a position of the workpiece relative to the position of the tool electrode in accordance with a contact point.

2. Description of the Related

FIG. 1 is a circuit diagram of a conventional contact sensing apparatus in an electric discharge machine. Reference symbol P denotes a tool electrode; W, a workpiece as an object subjected to machining; and E, a machining power source for generating a discharge current between the tool electrode P and the workpiece W. The machining power source is not associated with the scope of the present invention, and a detailed arrangement of the circuit will be omitted. Reference symbol D1 denotes a diode; R1 and R2, resistors, respectively; and C1, a compactor. In the conventional contact sensing apparatus in FIG. 1, a voltage of $-100$ V, $-200$ V or the like is applied to the tool electrode P from the machining power source to perform machining. During machining, the diode D1 blocks a voltage applied to the tool electrode P such that the voltage is not applied to the comparator C1. When the tool electrode P is positioned relative to the workpiece W, a low voltage $-V$ (e.g., $-5$ V or $-15$ V) is applied through the resistors R2 and R1 and the diode D, while the tool electrode P and the workpiece W are moved relative to each other. When the tool electrode P and the workpiece W are brought into contact with each other, an input to the comparator C1 changes through the diode D and the resistor R1. This change is compared with a reference voltage VL1 so as to detect a contact between the tool electrode P and the workpiece W. As a result, the relative positions of the tool electrode P and the workpiece W are detected.

However, since the tool electrode P and the workpiece W are brought into contact with each other while the low voltage is applied therebetween, rusting or the like occurs on the contact surface of the workpiece W. In order to detect the relative positions of the tool electrode P and the workpiece W, the tool electrode P and the workpiece W are several times repeatedly brought into contact with each other. However, when rusting or the like occurs on the contact surface of the workpiece W, electrical contact between the tool electrode P and the workpiece W becomes poor, so that repeated measurement precision is degraded. When the workpiece W comprises a carbide, cobalt contained in the carbide serves as a binder. The carbide tends to become damaged since it has an electrolytic property. In particular, when the carbide is dipped in water, the electrolytic reaction speed is increased. When a working liquid comprises water, the tool electrode P and the workpiece W are brought into contact with each other in water during positioning, thereby damaging the workpiece W since it is subjected to the electrolytic reaction.

When the tool electrode P and the workpiece W are for some reason kept in contact with each other for a long period of time during positioning, the workpiece W is electrolytically reacted and becomes scored, i.e., the surface of the workpiece W will have lines, marks, gauges, grooves, or other roughening. In order to prevent this, the tool electrode P and the workpiece W must be brought into contact with each other in a dry state. However, when a surface portion of the workpiece W is machined and subsequently another surface portion or another workpiece is subjected to alignment for machining, water must be removed from the workpiece W and the tool electrode P, thereby degrading the working efficiency. In addition to this disadvantage, the electric discharge machine itself must be modified in accordance with the presence/absence of water. It is desirable to align the workpiece and the tool electrode in the presence of water when the workpiece is actually machined.

In addition to the carbide workpiece, a molybdenum or chromium workpiece or the like is subject to electrolysis due to contact between the tool electrode P and the workpiece W at the time of position alignment. When an aluminum workpiece W is used, an insulating film is formed on its surface due to electrolysis. As a result, positioning cannot be properly performed, resulting in inconvenience. Furthermore, when machining is interrupted, as shown in FIG. 1, the low voltage $-V$ is constantly applied between the tool electrode P and the workpiece W, and the workpiece W made of an above-mentioned material is subject to electrolysis. As described above, when the aluminum workpiece is used, an insulating film is formed thereon, thus disabling reworking.

In a wire cut electric discharge machine, a wire electrode P is kept taut, and the workpiece W and the wire electrode P are brought into contact with each other for positioning. However, in this case, a Coulomb force is generated to move the wire electrode P by a distance of about 2 to 3 microns. As a result, high precision positioning cannot be performed.

SUMMARY OF THE INVENTION

It is an object of the present invention to eliminate the drawbacks of the conventional contact sensing apparatus and to provide a contact sensing apparatus in an electric discharge machine, wherein neither rusting occurs nor an insulating film is formed in positioning a tool electrode and a workpiece.

It is another object of the present invention to provide a contact sensing apparatus, wherein the electrode and the workpiece are brought into contact with each other several times without electrolytically reacting the workpiece, thus improving precision in repeated positioning.

It is still another object of the present invention to provide a contact sensing apparatus in an electric discharge machine, wherein an influence of the Coulomb force acting between the tool electrode, for example, a wire electrode, and the workpiece is eliminated when positioning a wire electrode and the workpiece.

In order to achieve the above objects of the present invention, there is provided a contact sensing apparatus in an electric discharge machine, comprising a pulse transformer for repeatedly applying pulsed positive and negative voltages between a tool electrode and a workpiece, the pulsed positive and negative voltages having an average voltage of "0", and a comparator for comparing a value from an absolute value circuit which receives a voltage applied between the tool electrode and the workpiece with a reference voltage, wherein the tool electrode and the workpiece are moved relative to each other while the pulsed positive and negative voltages are repeatedly applied between the tool electrode and the workpiece, and a contact between the tool electrode and the workpiece is detected in accordance with an output from said comparator, thereby detecting relative positions of the tool electrode and the workpiece.

According to the present invention, the pulsed voltages whose average voltage is "0" are repeatedly applied by the pulse transformer between the tool electrode and the workpiece so as to detect a contact between the tool electrode and the workpiece. Even if a short circuit is formed between the tool electrode and the workpiece, the average voltage is zero. In this sense, even if rusting occurs, the workpiece will not be corroded by electrolysis. As a result, repeated positioning and hence positioning between the electrode and workpiece are improved.

The Coulomb force will not arise since the positive and negative voltages are applied between the electrode and the workpiece. Thus, in a wire cut discharge machine, the wire electrode will not be attracted toward the workpiece. As a result, a position detection error will not occur.

DESCRIPTION OF THE PREFERRED EMBODIMENT

Figure 1:
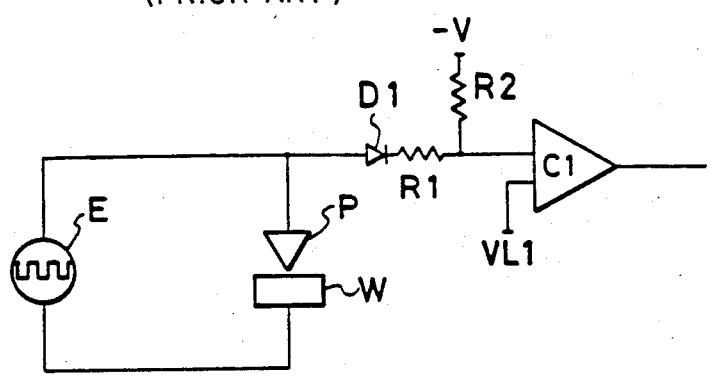
FIG. 1 is a circuit diagram of a conventional contact sensing apparatus in an electronic discharge machine.
Figure 2:
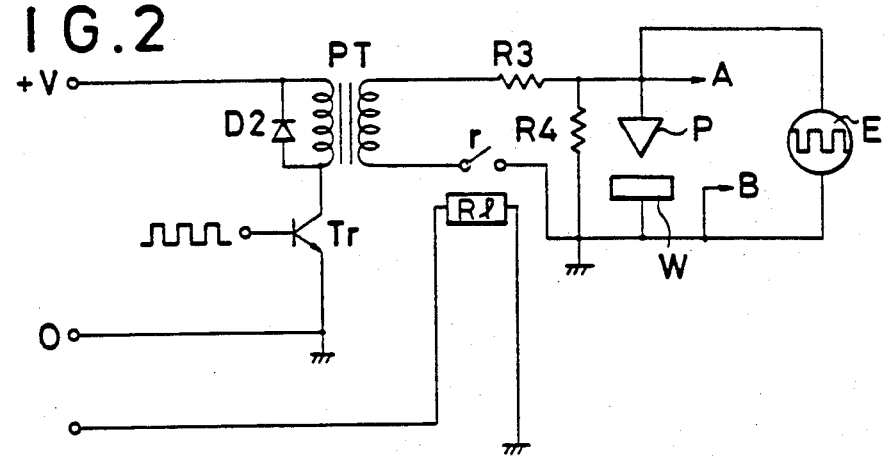
FIG. 2 is a circuit diagram of a contact sensing apparatus in an electric discharge machine according to an embodiment of the present invention.
Figure 2:
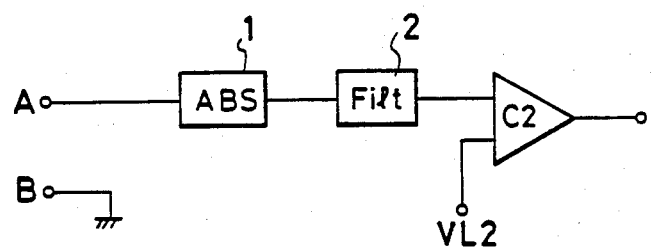

FIG. 2 is a circuit diagram of a contact sensing apparatus in an electric discharge machine according to an embodiment of the present invention. Reference symbol P denotes a tool electrode; W, a workpiece; E, a machining power source; PT, a pulse transformer; Tr, a transistor; R1 is a relay; r, a contact of the relay R; D2, a diode; and R3 and R4, resistors. A voltage between points A and B, i.e., between the tool electrode P and the workpiece W is supplied to a comparator C2 through an absolute value circuit 1 and a smoothing circuit, or filter, 2. The resultant voltage is compared by the comparator C2 with the reference voltage VL2. An output from the comparator C2 is used to detect whether or not the workpiece W and the tool electrode P are brought into contact with each other.

The operation of this embodiment will now be described.

Figure 3:
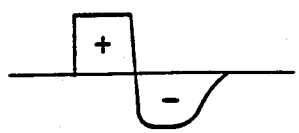
FIG. 3 is a graph showing an output from a pulse transformer.

The relay R1 is continuously operated while power is supplied from the machining power source and discharge machining is performed, so that the contact r of the relay R1 is kept open. However, when machining is not performed, the contact r of the relay R1 is closed. When the tool electrode P and the workpiece W are subjected to positioning during a nonmachining period, an oscillation pulse is supplied to the base of the transistor Tr. The transistor Tr repeats the ON/OFF operation. When a pulse current flows in the primary winding of the pulse transformer PT, the pulsed positive and negative voltages shown in FIG. 3 are induced at the secondary winding of the pulse transformer PT. These voltages have an average voltage of "0", i.e., the sum of the positive and negative pulses becomes "0". These voltages are applied between the tool electrode P and the workpiece W. At the same time, these voltages are supplied to the comparator C2 through the absolute value circuit 1 and the smoothing circuit 2. The resultant voltage is compared by the comparator C2 with the reference voltage VL2. The electrode P and the workpiece W are moved relative to each other. When the reference surface of the workpiece W and the tool electrode P are in contact with each other, an output of the A-B path becomes "0", and the comparator C2 generates an output which represents that the workpiece W and the tool electrode P are in contact with each other and a short circuit is formed therebetween.

I claim:

1. A contact sensing apparatus in an electric discharge machine, comprising:

pulse transformer means for repeatedly and continuously generating pulsed voltages between a tool electrode and a conductive workpiece, said pulsed voltages alternating between positive and negative voltage values and having an average voltage substantially equal to zero;

means for continuously preventing the output of said pulse transformer means from being applied between the tool electrode and the conductive workpiece during electric discharge machining; and means for determining the absolute voltage value of the voltage applied between the tool electrode and the workpiece, comparing the absolute voltage value with a reference voltage, and, in response thereto, generating an output representative of the relative positions of and contact between the tool electrode and the workpiece.

2. An apparatus according to claim 1, wherein said preventing means comprises a switch arranged so as to be continuously open during electric discharge machining.

3. An apparatus according to claim 2, wherein the tool electrode comprises a wire electrode.

4. A contact sensing apparatus for an electric discharge machine, comprising:

a voltage supply for repeatedly and continuously generating alternating, pulsed positive and negative voltages between a tool electrode and a conductive workpiece, said pulsed voltages having an average voltage value substantially equal to zero;

switch means, operatively connected to said voltage supply, for continuously preventing the pulsed voltages from being applied between the tool electrode and the conductive workpiece during discharge machining;

an absolute value circuit, operatively connected to said switch means, for receiving the pulsed voltage applied between the tool electrode and the workpiece and outputting a signal having a voltage value corresponding to the absolute value of the applied pulsed voltage; and a comparator, operatively connected to said absolute value circuit, for comparing the voltage value of the signal output from said absolute value circuit with a reference voltage value, and generating an output representative of the relative positions of and a contact between the tool electrode and the workpiece in accordance with the comparison.

5. An apparatus according to claim 4,
wherein said voltage supply comprises a pulse transformer having an output operatively connected to said switch means, and
wherein said switch means comprises a switch, operatively connected to the output of said pulse transformer, and to said absolute value circuit, for providing a continuous open circuit between said pulse transformer and one of the tool electrode and the conductive workpiece during electric discharge machining and for providing a continuous closed circuit therebetween when electric discharge machining is not being performed.

* * * * *